(12) United States Patent
Mayer

(10) Patent No.: US 9,792,199 B2
(45) Date of Patent: Oct. 17, 2017

(54) LIGHTWEIGHT TRACE BASED MEASUREMENT SYSTEMS AND METHODS

(71) Applicant: Infineon Technologies AG, Neubiberg (DE)

(72) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 750 days.

(21) Appl. No.: 13/689,826

(22) Filed: Nov. 30, 2012

(65) Prior Publication Data

US 2014/0156137 A1 Jun. 5, 2014

(51) Int. Cl.
*G06F 11/34* (2006.01)
*G06F 11/36* (2006.01)

(52) U.S. Cl.
CPC ...... *G06F 11/3636* (2013.01); *G06F 11/3466* (2013.01); *G06F 11/3476* (2013.01); *G06F 2201/865* (2013.01)

(58) Field of Classification Search
CPC ............. G06F 11/3636; G06F 11/3466; G06F 11/3776
USPC ................................................ 701/33.4, 33.6
See application file for complete search history.

(56) References Cited

U.S. PATENT DOCUMENTS

| 7,281,162 | B2 | 10/2007 | McDonald-Maier et al. | |
|---|---|---|---|---|
| 2005/0273218 | A1* | 12/2005 | Breed et al. | 701/2 |
| 2010/0153784 | A1* | 6/2010 | Inoue et al. | 714/38 |

FOREIGN PATENT DOCUMENTS

| WO | 2007048493 A1 | 5/2007 |
|---|---|---|
| WO | WO 2007048493 A1 * | 5/2007 |

* cited by examiner

*Primary Examiner* — Yazan Soofi
(74) *Attorney, Agent, or Firm* — Eschweiler & Potashnik, LLC

(57) ABSTRACT

An automotive electronics system includes an electronic control unit and a trace adapter. The electronic control unit is configured to receive measurement signals and provide control signals. Additionally, the electronic control unit is configured to generate or provide trace signals by replacing original instructions in a binary image with trace instructions. The trace instructions are functionally equivalent, but trigger providing the trace signals. The trace adapter is coupled to the electronic control unit. The trace adapter is configured to obtain the trace signals from the electronic control unit.

20 Claims, 4 Drawing Sheets

300

LSB = REPLACEMENT FLAG

400

LIGHTWEIGHT TRACE BASED MEASUREMENT SYSTEMS AND METHODS

BACKGROUND

Automotive systems are complex systems that include computers and components to operate and monitor the operation of automotive vehicles. The systems typically include a processor that controls and monitors engine operation and the like. The system generally operates various control systems that perform automotive functions. By monitoring, minor problems can be identified and corrected before becoming major problems.

However, monitoring and identifying faults can require substantial resources. These resources can be costly in terms of size and financial resources.

DETAILED DESCRIPTION

Figure 1:
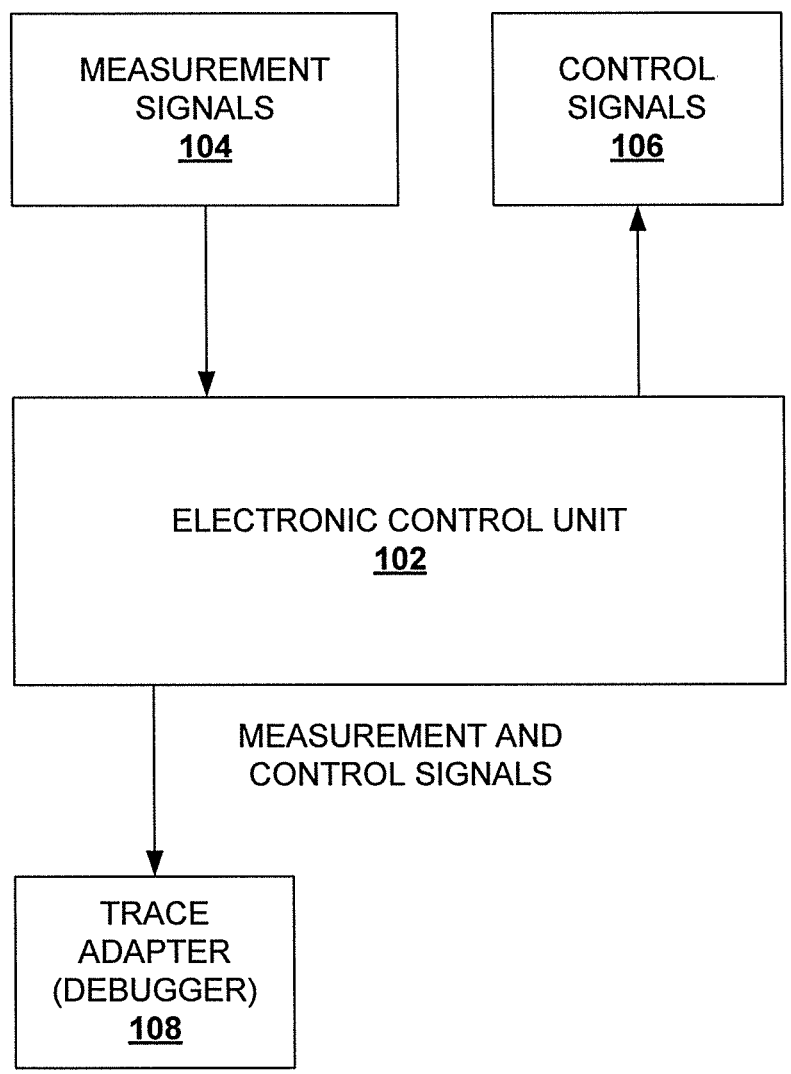
FIG. 1 is a block diagram of automotive electronics system that traces measurement and control signals.

The present invention will now be described with reference to the attached drawing figures, wherein like reference numerals are used to refer to like elements throughout, and wherein the illustrated structures and devices are not necessarily drawn to scale.

The present invention includes systems and methods for performing lightweight trace based measurements, including signal measurement and analysis for automotive systems.

FIG. 1 is a block diagram of automotive electronics system 100 that traces measurement and control signals. The system 100 is provided in a simplified format in order to facilitate understanding. It is appreciated that components and the like are omitted.

The system 100 includes an electronic control unit (ECU) 102 and a trace adapter 108. The ECU 102 is a system that controls and or monitors an electrical system in a motor vehicle. The ECU 102 can be assigned to particular functions and/or systems of the vehicle, for example, power train control, engine control, brake control, and the like. The ECU 102 generates and receives a variety of signals including measurement signals 104 and control signals 106.

The measurement signals 104 contain measurement information for one or more characteristics of the vehicle. For example, the measurement signals 104 can include vibration measurements, chemical measurements, temperature measurements, flow measurements, navigation information, position information, pressure information, temperature, and the like. The measurement signals 104 are provided by components and measure and or generate the measurement information including, for example, temperature sensors, coolant level sensors, hall effect sensors, crankshaft position sensors, gas pedal position sensors, and the like.

The ECU 102 generates the control signals 106 according to control algorithms based on the measurement signals 104. The control signals 106 include control information for various control systems for the motor vehicle. The control systems can include, for example, a speed control unit, an airbag control unit, a transmission control unit, a powertrain control unit and the like.

Each of the control signals 106 can be based on one or more of the measurement signals 104. For example, an engine control signal can be determined based on a torque measurement, temperature, angle of gas pedal and the like. The engine control signal, in one example, includes how much gas to inject at a particular time and to a selected cylinder.

The measurement signals 104 also provide feedback to the ECU 102 on the impact or resulting behavior of the generated control signals 106. For example, an engine control signal could correspond to selected speed of 60 mph, but could result in a measured speed of 55 mph. This could indicate an error or adjustment needed in the control algorithm used to generate the signal or that some other factor is impacting the resulting speed.

The trace adapter 108 obtains the measurement signals 104 and the control signals 106 via the electronic control unit 102 as trace signal. In one example, the signals are provided from one or more signal buses. In another example, the signals are tied to memory locations in a main memory or other memory.

The trace adapter 108 analyzes the measurement signals 104 and the controls signals 106 to identify faults. The faults indicate an erroneous condition including, but not limited to, a deficient control algorithm, omission of needed input signal, faulty control component, faulty sensor, and the like.

The trace adapter 108 can include or have an associated trace memory for storing and analyzing the trace signals. For example, a trace memory can be included as part of the trace adapter 108. As another example, an external memory separate from the control unit and the trace adapter 108 can be utilized.

The ECU 102 provides the trace signals by replacing binary level instructions with functionally equivalent trace functions. The instructions are replaced without having to recompile, relink code, and the like. The replacement trace functions perform an additional operation of sending trace information to the trace adapter 108. The trace functions can include, for example, a trace store operation (STT), which operates functionally equivalent to a store operation, however it also copies the data to be stored and the address to the trace adapter. As a result, operation of the ECU 102 performs substantially similar whether original instructions are replaced with trace instructions or not.

The ECU 102 selects or filters which instructions to replace using a suitable mechanism. In one example, a list of trace addresses is maintained. On identification of an instruction matching an address from the list of trace addresses, the original instruction is replaced with a trace instruction.

Other approaches exist to obtaining trace information. In one example, a processor is programmed to collect trace information during its operation. However, source code, compiled code and the like need to be modified in order for the processor to be configured to collect the information. Further, a portion of the processors bandwidth is consumed with trace information collection.

In another example, a mirror memory is configured to mirror the contents of a main memory. A trace adapter accesses the mirror memory to identify trace information.

However, a separate memory may not be present or available in automotive systems. Further, considerable communication bandwidth is required to update the mirror memory. Such use is taxing on the system and costly in terms of consumed resources.

Figure 2:
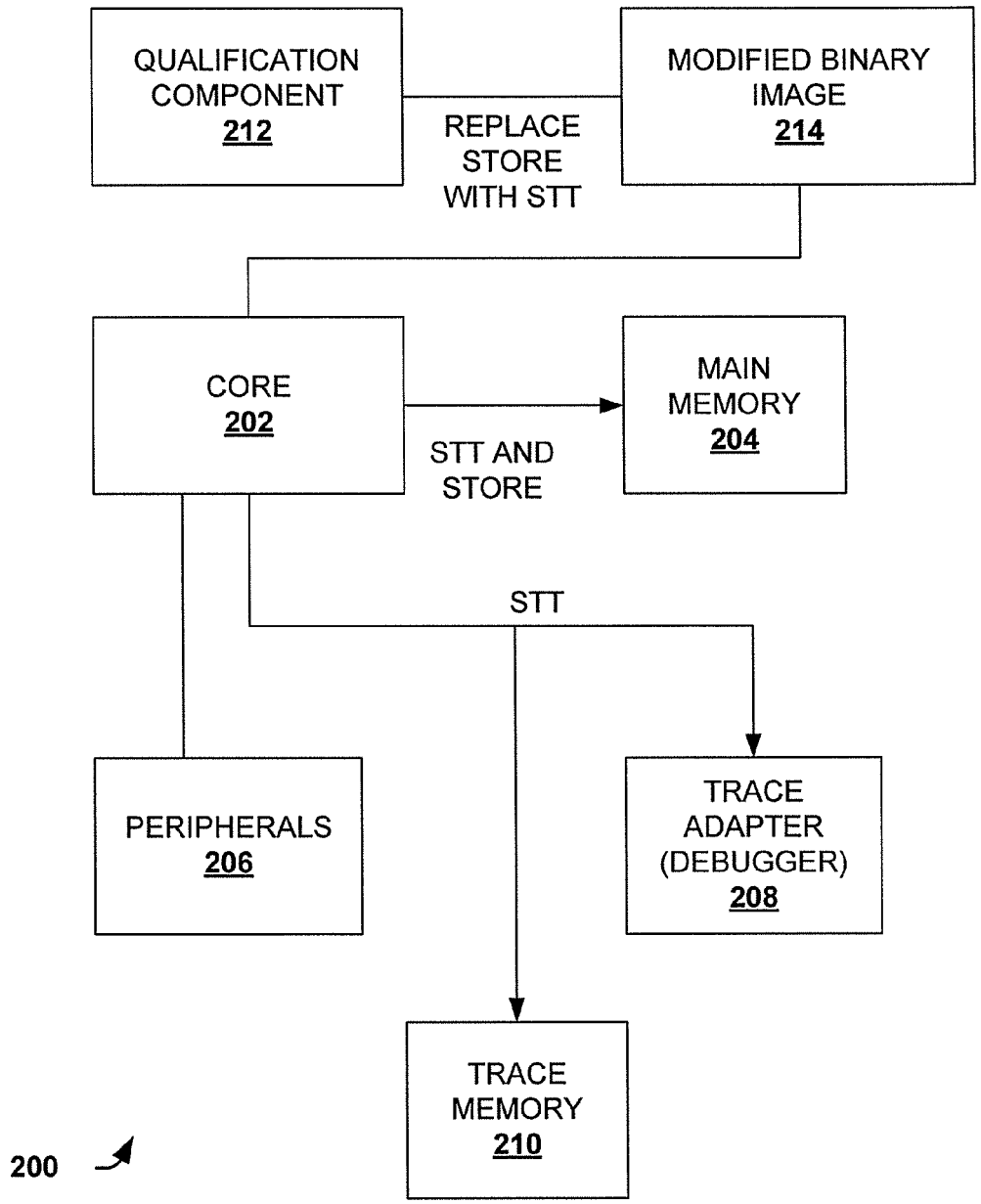
FIG. 2 is a block diagram of an electronics system that can be utilized with automotive electronic systems.

FIG. 2 is a block diagram of an electronics system 200 that can be utilized with automotive electronic systems. The system 200 uses replacement instructions to efficiently obtain and analyze trace signals. The system 200 can be utilized or incorporated into the system 100 described above in FIG. 1.

The system 200 includes a processor core 202, a main memory 204, peripherals 206, a trace adapter 208, a trace memory 210, and a qualifications component 212. The processor core 202 interacts and/or operates with an automotive control system. The processor core 202 executes instructions and performs operations specified by the instructions. The instructions include store and move operations.

The processor core 202 utilizes the main memory 204 to access and retrieve stored information. The information is stored in the main memory 204. Additionally, the information is specified or referenced by an associated instruction. The instruction includes an operation, data to be stored, and a location for the data. The location can be provided directly or indirectly and specifies where the data or information is accessed within the main memory 204.

At least a portion of the information stored within the main memory 204 can include debug or trace information. The trace information includes measurement information and control information and is at least partially filtered from the information in the main memory. The measurement information is based on measurement signals received from one or more automotive measurement components and/or sensors (not shown). The measurement information includes information about one or more characteristics of the automotive vehicle. For example, the measurement information can include vibration measurements, chemical measurements, temperature measurements, flow measurements, navigation information, position measurements, pressure, and the like.

The control information includes information, typically provided as signals that control operation for various systems of the vehicle. The control information is typically based on at least a portion of the measurement information. The controlled systems of the vehicle can include, for example, a speed control unit, an airbag control unit, a transmission control unit, a powertrain control unit, and the like.

The core 202 generates the core information by executing control algorithms based on at least a portion of the measurement information. For example, measurement information that includes vibration and/or motion information can be used to generate control information for an air bag control system.

The qualification component 212 identifies instructions in an original binary image related to trace information and replaces associated instructions with trace instructions. The trace instructions perform the same function as the replaced instructions, but also copy the trace information to the trace memory 210 and/or the trace adapter 208. The trace information provided by a trace instruction includes the data to be stored/written, the instruction, address of the data, and the like.

The trace instructions replace associated instructions prior to system operation. Thus, an original binary image is updated or replaced with a modified binary image 214 that replaces the associated instructions with the trace instructions'. The modified binary image 214 has the same size and functionality of the original binary image, but includes the trace instructions. Further, the modified binary image may have a varied checksum value, which can be updated for verification of the binary image.

The qualification component 212 can identify the instructions to be replaced in the original binary image 214 using a suitable mechanism. In one example, a list of addresses associated with sensors and control systems is maintained. When an address for an instruction matches the list, the instruction is replaced and the trace information is provided to the trace adapter 208 and/or the trace memory 210.

The qualification component 212 also facilitates providing relevant trace information from the same time period. Thus, the measurement information along with the control information from the same time period is provided. It is noted that the time period can be time based, such as a number of nano seconds or it can be mechanical based, such as position of a drive shaft.

Replacing instructions and generating trace information for instructions that include local variables can also be provided. One suitable mechanism is to output an address of the replaced instruction, an instruction pointer (IP). The IP can be utilized to derive the address and data, which contains the trace information.

The peripherals 206 include one or more peripherals, such as a timer, a coder, a compression device, a network interface, input devices, output devices, keyboards, monitors, and the like. The peripherals 206 are coupled to the core 202. In one example, one or more buses are utilized to couple the peripherals 206 to the core 202. The peripherals 206 can also include sensors that provide measurement information and control components that are controlled by the control information.

The trace memory 210 is a memory or storage element separate from the main memory. The trace memory 210 is utilized primarily by the trace adapter. The trace memory 210 includes trace information, which includes measurement information and control information. The trace memory 210 obtains the trace information as described above. It is noted that the trace memory 210 is generally substantially smaller than the main memory 204.

The trace memory 210 can be configured in one of a number of suitable ways. The trace memory 210 can be integrated with the core 202 and/or the trace adapter 208. Alternately, the trace memory 210 can be provided as an external component. Further, the trace memory 210 can merely be a portion of another memory, even the main memory 204.

The trace memory 210 is coupled to the core 202 and the trace adapter 208. In one example, a bus is utilized to couple the trace memory 210 to the core 202. In another example, a trace bus used for trace/debugging purposes is utilized to couple the trace memory 210 to the core 202.

The trace adapter 208 is also coupled to the core 202 and the trace memory 210. The trace adapter 208 can be coupled to the core 202 via a suitable mechanism, such as a bus or trace bus, as described above. The trace adapter 208 collects and/or gathers the trace information. Additionally, the trace adapter 208 can develop analysis information based on the trace information. The trace adapter 208 is configured to provide the trace information and/or analysis information on request to other components, such as an external computer for additional analysis.

The trace information can be utilized by the trace adapter 208 or other component to analyze and identify faults in the system and/or corrective actions. For example, the analysis can identify a needed change in an algorithm for generating a control signal or control information. As another example, the analysis could identify a faulty/defective sensor providing defective measurement information.

If the trace adapter 208 is part of or integrated with the core 202, a side band signal can be activated to indicate that a trace instruction, such as STT, qualifies. In another example, the trace adapter 208 is not integrated with the core 202, and a qualification signal is transmitted to the trace adapter 208 to indicate that trace information is being provided.

Figure 3:
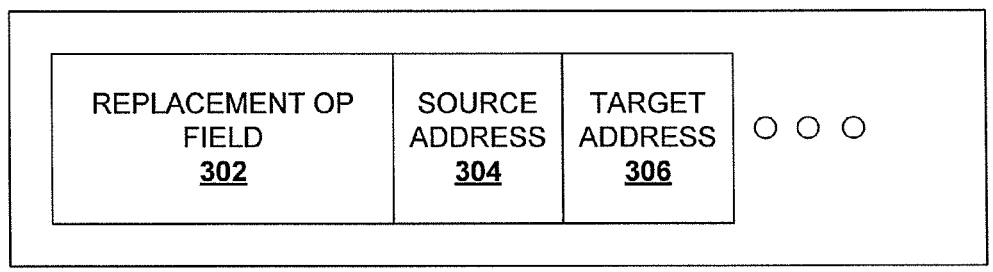
FIG. 3 is a diagram illustrating a trace instruction having an altered operation field.
Figure 4:
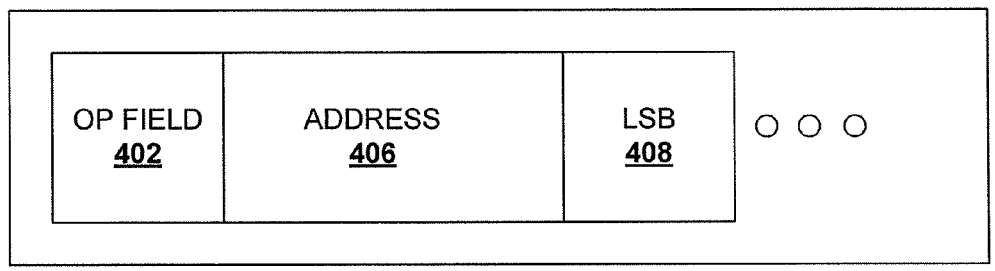
FIG. 4 is another diagram illustrating a trace instruction having an altered address field to indicate that it is a trace instruction.

FIGS. 3 and 4 provide examples of suitable mechanisms to introduce trace instructions that replace original instructions and trigger sending of trace information to a trace adapter. It is appreciated that other mechanisms are contemplated and can be utilized.

FIG. 3 is a diagram illustrating a trace instruction 300 having an altered operation field. The instruction includes several fields or parts including an op field 302, a source address 304, and a target address 306. The op field 302 includes an operation code that indicates an operation to be performed, such as load, store, move, and the like. The source address 304, if present, points to a source location for data. The target address 306 points to a destination location for data.

In this example, the op field 302 has distinct values that correspond to trace instructions. The values may vary by only a single bit, but the variation identifies that this instruction performs a specified operation and that the trace information is to be provided.

FIG. 4 is another diagram illustrating a trace instruction 400 having an altered address field to indicate that it is a trace instruction. The trace instruction 400 is similar to the trace instruction 300, describe above. However, here, the op field is not modified to include trace functionality.

The trace instruction 400 includes an op field 402, an address field 406, and a replacement or trace flag 408. The op field 402 is a standard operation field and indicates an operation to perform without an indication on providing trace information.

In this example, the address field 406 has extra bits that are not needed to address the available memory address. For example, the address field can have a capacity to address 4 Gigabytes of memory when only 2 Megabytes are available. Thus, extra bits can be used to indicate or filter trace information. Here, a least significant bit is used as the replacement flag 408. This approach can be used for 16, 32 or 64 bit accesses. When the replacement bit is set to a trace activated value, i.e., 1, the instruction operates while providing trace information. When the replacement bit is set to a trace deactivated value, i.e., 0, the instruction performs without providing trace information. Another option is to distinguish with the most significant bit(s).

Figure 5:
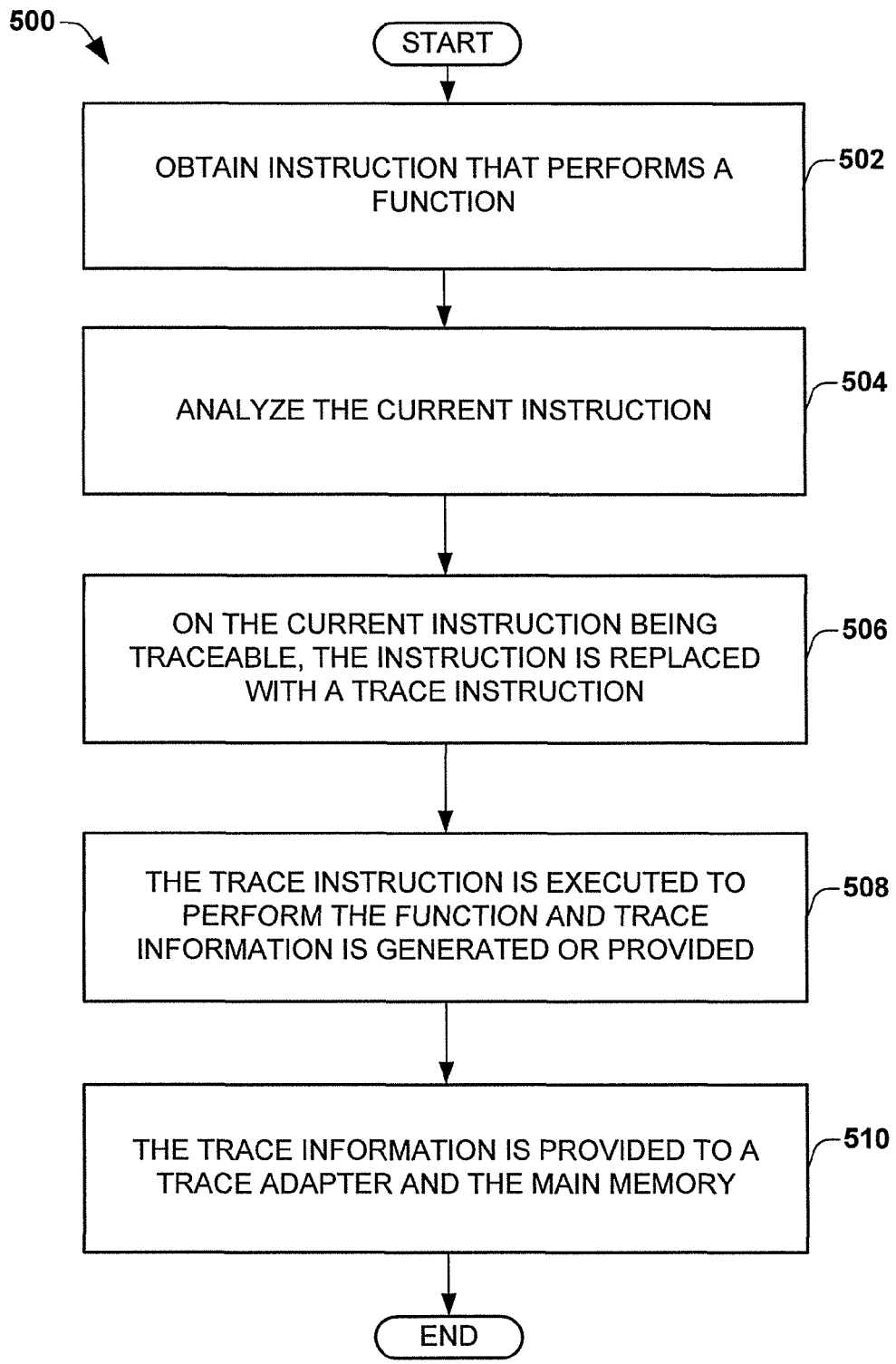
FIG. 5 is a flow diagram illustrating a method of operating an automotive electronics system and providing trace information.

FIG. 5 is a flow diagram illustrating a method 500 of operating an automotive electronics system and providing trace information. The method 500 obtains trace information without substantially impacting operation of the electronics system and/or the vehicle. The method 500 identifies instructions in a binary image relevant to trace information and replaces only those so that the generation of trace information is filtered from all the signals and information present. The image with the trace instructions is referred to as a modified binary image.

While method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The method 500 begins at block 502, where an instruction of a binary image is obtained. The instruction includes an op code or field, data and one or more addresses.

The current instruction is analyzed to identify whether the current instruction is a traceable instruction at block 504. A traceable instruction is one that includes trace information, such as measurement information and/or control information.

On the current instruction being traceable, the current instruction of the binary image is replaced with a trace instruction at block 506. The trace instruction is functionally equivalent to the current instruction, but initiates the sending of trace information when executed. For example, a store instruction can be replaced with a store trace (STT) instruction.

If the current instruction is not deemed traceable, then the instruction is not replaced and the method continues with a next instruction of the binary image.

The trace instruction is executed and trace information is provided at block 508 when the binary image is executed. The trace information is provided via a suitable mechanism. In one example, the trace instruction initiates a sideband signal to indicate that trace information is being sent. In another example, a direct memory access procedure is utilized to send the trace information. A checksum for the binary image can be updated after replacing the instruction with the trace instruction.

The trace information generally includes measurement information and control information. The trace information can also include an instruction pointer, register, register value, target address, source address, and the like.

The trace information is provided to a trace adapter and the main memory at block 510. The trace information is provided to the main memory as if the original instruction was executed. Additionally, the trace information is provided to the trace adapter.

The trace adapter can perform additional analysis using the information. Further, the trace adapter can summarize and provide the information and analysis to other components, such as a personal computer.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement method 500). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

An automotive electronics system includes an electronic control unit and a trace adapter. The electronic control unit is configured to receive measurement signals and provide control signals. Additionally, the electronic control unit is configured to generate or provide trace signals by replacing original instructions with trace instructions. The trace instructions are functionally equivalent, but trigger providing the trace signals. The trace adapter is coupled to the electronic control unit. The trace adapter is configured to obtain the trace signals from the electronic control unit.

A trace system includes a core component, a main memory, and a qualification component. The core component is a core processor or processor system and is configured to perform provided instructions. The main memory is configured to maintain and access stored information. Thus, the provided instructions can reference and utilize the main memory. The qualification component is configured to filter or identify traceable instructions of the provided instructions. The identified instructions are replaced with trace instructions that perform the same function, but trigger the sending of trace information. A trace adapter can be coupled to the core component and configured to receive the trace information generated by the trace instructions.

A method of operating an automotive electronics system is disclosed. A current instruction is obtained. The current instruction is identified as a traceable instruction. The current instruction is replaced with a trace instruction. The trace instruction is functionally equivalent to the current instruction and provides trace information. The trace instruction is executed. The trace information associated with the trace instruction is provided.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An automotive electronics system comprising:
    an electronic control unit configured to receive measurement signals and provide control signals based on the measurement signals, wherein the electronic control unit is further configured to obtain original instructions from a main memory, identify instructions of the original instructions related to trace information, and generate trace signals by replacing the identified instructions with trace instructions; and
    a trace adapter coupled to the electronic control unit and configured to obtain the trace signals from the electronic control unit and identify a fault based on the trace signals.

2. The system of claim 1, further comprising a plurality of sensors configured to provide the measurement signals.

3. The system of claim 2, further comprising a plurality of automotive components configured to operate according to the control signals.

4. The system of claim 3, wherein the plurality of sensors include a gas flow sensor.

5. The system of claim 3, wherein the plurality of automotive components includes an engine injection controller.

6. The system of claim 1, wherein the trace signals include trace information associated with a control algorithm for a single time period.

7. The system of claim 1, wherein the original instructions include a store instruction.

8. The system of claim 1, wherein the trace instructions include a store trace instruction, wherein the store trace instruction is functionally equivalent to a store instruction and additionally supplies trace information to the trace adapter.

9. The system of claim 1, wherein the trace adapter is configured to store trace information from the trace signals.

10. The system of claim 1, wherein the electronic control unit is configured to identify trace associated instructions in a binary image.

11. The system of claim 10, wherein the electronic control unit is configured to replace the associated instructions in the binary image with trace instructions prior to execution of the binary image.

12. The system of claim 1, wherein the trace adapter is integrated with the electronic control unit.

13. A trace system comprising:
    a processor core component configured to execute a binary image;
    a main memory coupled to the processor core component and configured to maintain and access stored information, the stored information including the binary image and a list of addresses; and
    a qualification component configured to identify instructions of the binary image related to trace information according to the list of addresses and replace the identified instructions of the binary image with trace instructions.

14. The system of claim 13, further comprising a trace adapter coupled to the core component and configured to receive trace information generated by the trace instructions.

15. The system of claim 14, wherein the trace adapter is configured to analyze the trace information to identify erroneous control signal determinations.

16. The system of claim 14, wherein a side band signal is generated by the core component on performing one of the trace instructions.

17. The system of claim 13, further comprising a trace memory, separate from the main memory, the trace memory configured to receive trace information from the core component.

18. A method of operating an automotive electronics system, the method comprising:
    obtaining a current instruction of a binary image from a main memory;
    identifying the current instruction as a traceable instruction by a qualification component based on whether the current instruction includes trace information;
    on identifying the current instruction as a traceable instruction, replacing the identified instruction of the binary image with a trace instruction, wherein the trace instruction is functionally equivalent to the current instruction and provides trace information by the qualification component;
    executing the binary image; and
    providing trace information associated with the trace instruction.

19. The method of claim 18, further comprising providing the trace information to a main memory and a trace adapter.

20. The method of claim 18, wherein identifying the current instruction as a traceable instruction comprises comparing the current instruction with a trace list.

\* \* \* \* \*